(12) United States Patent
Zeng

(10) Patent No.: US 6,244,927 B1
(45) Date of Patent: Jun. 12, 2001

(54) MULTI-FUNCTIONAL SENSING METHODS AND APPARATUS THEREFOR

(75) Inventor: Jiyue Zeng, Bellevue, WA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/143,678

(22) Filed: Aug. 31, 1998

(51) Int. Cl.$^7$ ........................................................ B24C 3/00

(52) U.S. Cl. ................................. 451/2; 451/4; 451/99; 451/102

(58) Field of Search ................................. 451/2, 40, 99, 451/102

(56) References Cited

U.S. PATENT DOCUMENTS

| | | | |
|---|---|---|---|
| 3,516,204 | 6/1970 | Kulischenko | 51/8 |
| 3,769,753 | * 11/1973 | Fleischer . | |
| 3,994,079 | 11/1976 | Mirman | 35/53 |
| 4,380,138 | 4/1983 | Hofer | 51/321 |
| 4,412,402 | 11/1983 | Gallant | 51/439 |
| 4,753,051 | 6/1988 | Tano et al. | 51/421 |
| 4,941,955 | 7/1990 | Schuster . | |
| 4,966,059 | 10/1990 | Landeck . | |
| 5,089,685 | 2/1992 | Schmidt-Hebbel | 219/121.83 |
| 5,166,885 | 11/1992 | Thompson | 364/473 |
| 5,207,533 | 5/1993 | Federspiel et al. . | |
| 5,222,332 | 6/1993 | Mains, Jr. | 51/320 |
| 5,341,608 | * 8/1994 | Mains, Jr. . | |
| 5,401,204 | * 3/1995 | Shank . | |
| 5,501,104 | 3/1996 | Ikeda et al. . | |
| 5,700,181 | * 12/1997 | Hashish et al. . | |

FOREIGN PATENT DOCUMENTS

| | | | |
|---|---|---|---|
| 4219423C | 11/1993 | (DE) | B24C/7/00 |
| 0713745A | 5/1996 | (EP) | B23K/26/14 |
| 61-4670 | 1/1986 | (JP) . | |

OTHER PUBLICATIONS

European Search Report dated Dec. 13, 2000, Application No. EP 99306818 (3 Pages).

Patent Abstracts of Japan, Sugiyama Hisao, Mitsubishi Electric Corp., Laser Cutting and Processing Device, Publication No. 03285783, Publication Date Dec. 16, 1991, Copyright:(C)1991, JPO&Japio.

The Future of Waterjet Cutting, Terry D. Alkire, Manufacturing Technology International, Sterling Publications Ltd., London 1990, pp. 201,202–204, XP 000178307.

Zeng, et al., "Quantitative Evaluation of Machinability in Abrasive Waterjet Machining," Precision Machining: Technology and Machine Development and Improvement; PED–vol. 58;pp. 169–179 (1992).

(List continued on next page.)

Primary Examiner—Timothy V. Eley
Assistant Examiner—Willie Berry, Jr.
(74) Attorney, Agent, or Firm—Leon Nigohosian, Jr.

(57) ABSTRACT

A method and apparatus for sensing a pierce-through condition of a material made by a piercing force in which a shield surrounding a source of the piercing force is supplied with a gas supply to create a pressure within the shield means. A decrease in pressure caused within the shield by a pierce-through condition created by the piercing force is then detected. A method and apparatus for detecting the distance between a nozzle assembly for a machining process and a workpiece to be machined in which gas is supplied to a shield surrounding a nozzle assembly. An increase in pressure in the shield is detected as an open end of the shield approaches a workpiece to be machined. A method and apparatus for obtaining and maintaining a predetermined gap distance between nozzle assembly and a workpiece for a machining process are provided by further detecting when the pressure within the shield means reaches a pressure corresponding values and ranges. A method and apparatus for determining the thickness of a workpiece is further provided by comparing an established nozzle assembly position with a predetermined reference position.

14 Claims, 3 Drawing Sheets

OTHER PUBLICATIONS

Jiyue Zeng and Jose P. Munoz, "Intelligent Automation of AWJ Cutting for Efficient Production," *Proceedings of the 12th International Symposium on Jet Cutting Tech.,* pp.401–408 BHRA, Rouen, France (1994).

Smartline™ Expert System Software for Fluid Jet Cutting; Ingersoll–Rand® Brochure, 2 pages (1996).

J. Zeng, J. Munoz, and Ihab Kain, "Milling Ceramics with Abrasive Waterjets—An Experimental Investigation," *Proceedings of the Ninth American Waterjet Conference:* Waterjet Technology Ass'n., Dearborn, MI, pp. 93–108. (Aug. 23–26, 1997).

Zeng, J. and Kim, T., "The Machinability of Porous Material by a High Pressure Abrasive Waterjet," *Proceedings of the Winter Annual Meeting of ASME,* San Francisco, U.S.A., pp.37–42 (1989).

Ohlsson, et al., "Optimisation of the Piercing or Drilling Mechanism of Abrasive Water Jets," *Proceedings of the 11th Int'l Conference on Jet Cutting Technology,* Scotland, pp. 359–370 (Sep. 1992).

O'Keefe Controls Co. "Air Proximity Sensor" Brochure, Form OK–098 4 pages (1993).

O'Keefe Controls Co. "Products Manufactured" Brochure, Form OK–096 R1, 2 pages (1994).

O'Keefe Controls Co. "Accessories for Pheumatic Controls", Brochure, Form OK–063R2, 2 pages (1996).

O'Keefe Controls Co. Air Proximity Sensor System Electric Output Brochure, Form OK–164, 2 pages (not dated).

O'Keefe Controls Co. "Air Proximity Sensor System Pneumatic Output" Brochure, Form OK–165, 2 pages (not dated).

Quest 2800 Impulse Integrating Sound Level Meter, Quest Technologies Brochure, p.35 (not dated).

Motion Control Systems, Inc. Acroloop ACR2000 (1–4 Axes Controller), Newsleter, 6 pgs. (Jun. 1997).

"Load Cells" Sens–All, Inc. Advertisement, 1 pg (not dated).

"Abrasive Water Jets for Demilitarization of Explosive Materials" D. Miller, 8th American Water Jet Conference, p.457 (not dated).

"Selecting and Justifying a Laser Cutting System: Examining the Benefits of Lasers", Sheet Metal Cutting, pp. 20–23 (not dated).

"New Developments in Laser Fusion Cutting," Sheet Metal Cutting, pp. 68–69 (not dated).

"Cuting with Precision Plasma Technology: Stabilized Jet Helps Improve Cut Quality", Sheet Metal Cutting, pp. 72,73 (not dated).

* cited by examiner

MULTI-FUNCTIONAL SENSING METHODS AND APPARATUS THEREFOR

BACKGROUND OF THE INVENTION

This invention relates generally to sensing methods and apparatus and more particularly to sensing methods and apparatus for monitoring abrasive waterjet machining of engineering materials.

Abrasive water jet (AWJ) processes employ abrasive materials entrained into a high-pressure waterjet to perform a variety of cutting and other machining operations on a variety of materials. The high-energy waterjet beam utilized combines a rapid erosion of a workpiece material by high speed solid particle impacts with rapid cooling provided by a waterjet. In AWJ cutting operations an abrasive waterjet pierces through the thickness of and is then moved along a material to be cut.

In performing machining operations such as AWJ cutting, various physical dimensions such as workpiece thickness must be measured in order to properly configure the water pressure, abrasive flow rate, and other system parameters for the AWJ apparatus. Additionally, the proximity of and distances between various components of the AWJ apparatus and the workpiece must be monitored. For example, the proximity of an AWJ nozzle to a workpiece must be monitored with respect to establishing and maintaining air gap and stand-off distances within acceptable tolerance ranges. Additionally physical events such as the moment of pierce-through of a workpiece by an AWJ waterjet during a cutting operation must also be detected in order to establish when the relative motion between the workpiece and an AWJ nozzle should be commenced.

Although the measuring and monitoring of these and other physical aspects may be done by visual inspection and manual control by an operator, this is generally a cumbersome and not very precise method for controlling such machining operations. The foregoing illustrates limitations known to exist in present machining methods and apparatus. Thus, it is apparent that it would be advantageous to provide an alternative directed to overcoming one or more of the limitations set forth above. Accordingly a suitable alternative is provided by the multi-functional sensing methods and apparatus of the present invention, which include features more fully disclosed herein.

SUMMARY OF THE INVENTION

The present invention provides a method and apparatus for sensing a pierce-through condition of a material made by a piercing force in which a shield surrounding a source of the piercing force is supplied with a gas supply to create a pressure within the shield means. A decrease in pressure caused within the shield by a pierce-through condition created by the piercing force is then detected thereby detecting the pierce-through condition.

Also provided are a method and apparatus for detecting the distance between a nozzle assembly for a machining process and a workpiece to be machined in which gas is supplied to a shield surrounding a nozzle assembly. An increase in pressure in the shield is detected as an open end of the shield approaches a workpiece to be machined.

A method and apparatus for obtaining and maintaining a predetermined gap distance between a nozzle assembly and a workpiece for a machining process are provided by further detecting when the pressure within the shield means reaches a corresponding pressure value and range, respectively. A method and apparatus for determining the thickness of a workpiece is further provided by comparing an established nozzle assembly position with a predetermined reference position.

It is to be understood that both the foregoing general description and the following detailed description are exemplary, but are not restrictive, of the invention. The foregoing and other aspects will become apparent from the following detailed description when read in conjunction with the accompanying drawing figures.

DETAILED DESCRIPTION OF THE INVENTION

Figure 1:
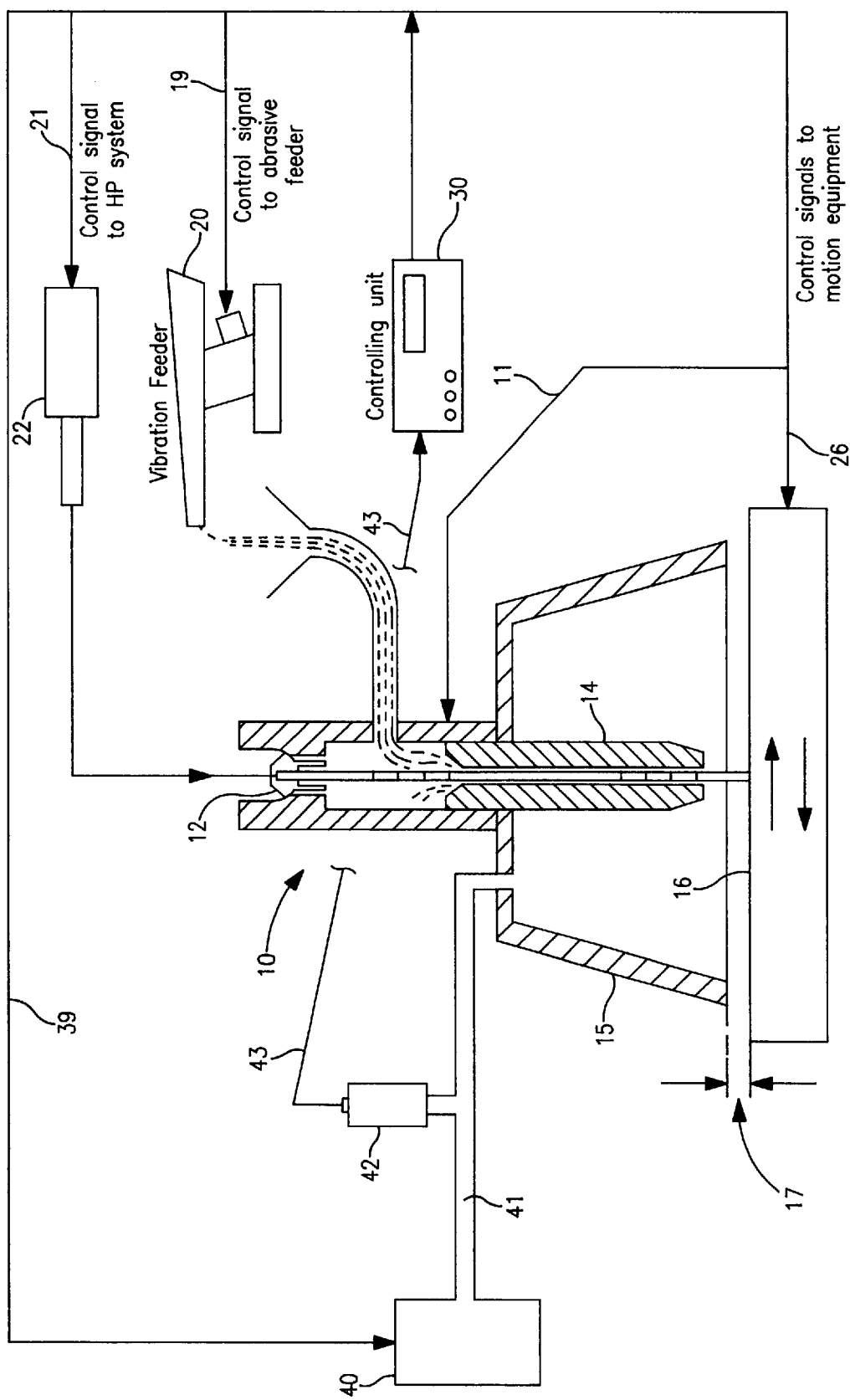
FIG. 1 is a general symbolic diagram of the components of an abrasive waterjet system according to the present invention.

The sensing apparatus and method of the present invention are best understood from the following detailed description when read in connection with the drawing figures in which like reference numerals refer to like elements throughout. It is emphasized that according to common practice, the various dimensions of the apparatus shown in the drawings are not to scale.

Referring now to the drawing, FIG. 1 shows a broad system diagram of an embodiment of the invention as applied to an abrasive waterjet (AWJ) system. Briefly, shown in FIG. 1 is a nozzle assembly 10 comprised of an orifice 12 and a focusing tube 14 which applies a mixture of high pressure water and abrasive to a moving workpiece 16. Nozzle assembly 10 is preferably supplied abrasive from an optional vibration feeder 20 and high pressure water from a water source 22. Although shown using a vibration feeder, it is understood that other types of feeding devices, which are known and will be readily recognized by those having ordinary skill in the art, may be used for this purpose.

A controlling unit 30 is typically provided for receiving input on the operating conditions of the AWJ system and controlling the motion of nozzle assembly 10 and workpiece 16. Controlling unit 30 is preferably a Computerized Numerical Controller (CNC) which is available and known to those in the art and may include, e.g., the Model ACR 2000 motion controller which is available from Acroloop Motion Control Systems, Inc., Chanhassen, Minn.

Prior to performing an AWJ cutting or other machining operation, controlling unit 30 is preset by a user with AWJ system operating parameters such as water pressure, abrasive particle size, abrasive flow rate, and the dimensions of the waterjet nozzle orifice. These parameters are varied depending on the type of workpiece material and the type of machining operation to be performed. In operation, controlling unit 30 controls the feed from vibration feeder 20 and the feed supply of high pressure water from water source 22 as is known in the art. As high pressure water and abrasives are supplied to the nozzle, the workpiece 16 is moved back and forth by positioning equipment (not shown) which maneuvers the workpiece at the proper traverse speed for the desired cutting or other machining operation. Preferably, the positioning equipment is responsive to and controlled by a control signal 26 provided by controlling unit 30, which may be also used to calculate the traverse speed as is known in the art.

Multi-Functional Sensing Apparatus

Shown in FIG. 1 on nozzle assembly 10 is the multi-functional sensing apparatus according to the present invention which comprises a nozzle shield 15 surrounding the focusing tube 14. Nozzle shield 15 is connected to and in fluid communication with an air or other gas supply 40 via a conduit 41. A pressure sensor 42 is connected to conduit 41 and located between nozzle shield 15 and air supply 40 for sensing the pressure conditions inside nozzle shield 15 and providing a pressure sensor signal 43 to controlling unit 30.

Operation for Performing AWJ Cutting Using Multi-Functional Sensing Apparatus

Figure 3:
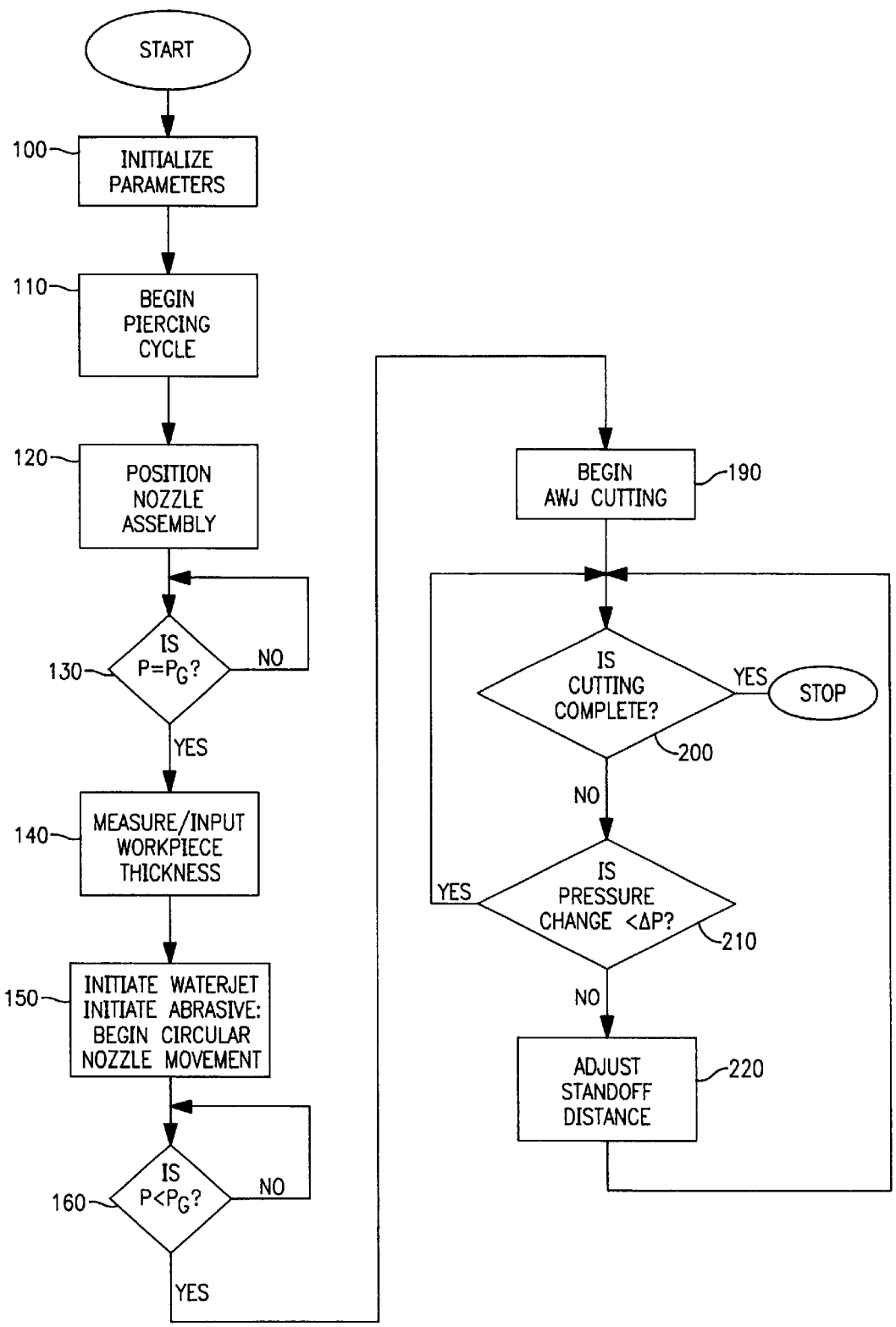
FIG. 3 is a program flow chart for a software program resident in the programmable controlling unit of FIG. 1 for performing a cutting method using the sensing apparatus according to the present invention.

Operation of the AWJ apparatus shown in FIG. 1 will now be described with respect to performing an AWJ cutting operation according to the automated sensing method of the present invention. Turning to the flow diagram in FIG. 3, controlling unit 30 is initialized in Step 100 by inputting the specific AWJ system operating parameters required by controlling unit 30 prior to beginning an AWJ cutting cycle, as is known in the art. As described above these operating parameters typically include water pressure, abrasive particle size, abrasive flow rate, and the dimensions of the waterjet nozzle orifice.

A. Positioning Nozzle Assembly at a Predetermined Stand-Off Distance

Controlling unit 30, upon receiving a user instruction to begin a cutting sequence, begins a piercing cycle in Step 110 by generating a control signal 39 in Step 110 to air supply 40 thereby initiating airflow into nozzle shield 15 via conduit 41. Pressure sensor 42 generates and provides to controlling unit 30 an output signal 43 similar to that shown in FIG. 2 indicating the pressure condition inside nozzle shield 15 as a function of time. Controlling unit 30 generates a control signal 11 instructing motion equipment (not shown) to lower nozzle assembly in Step 120 to a form an air gap 17 having a predetermined height.

Figure 2:
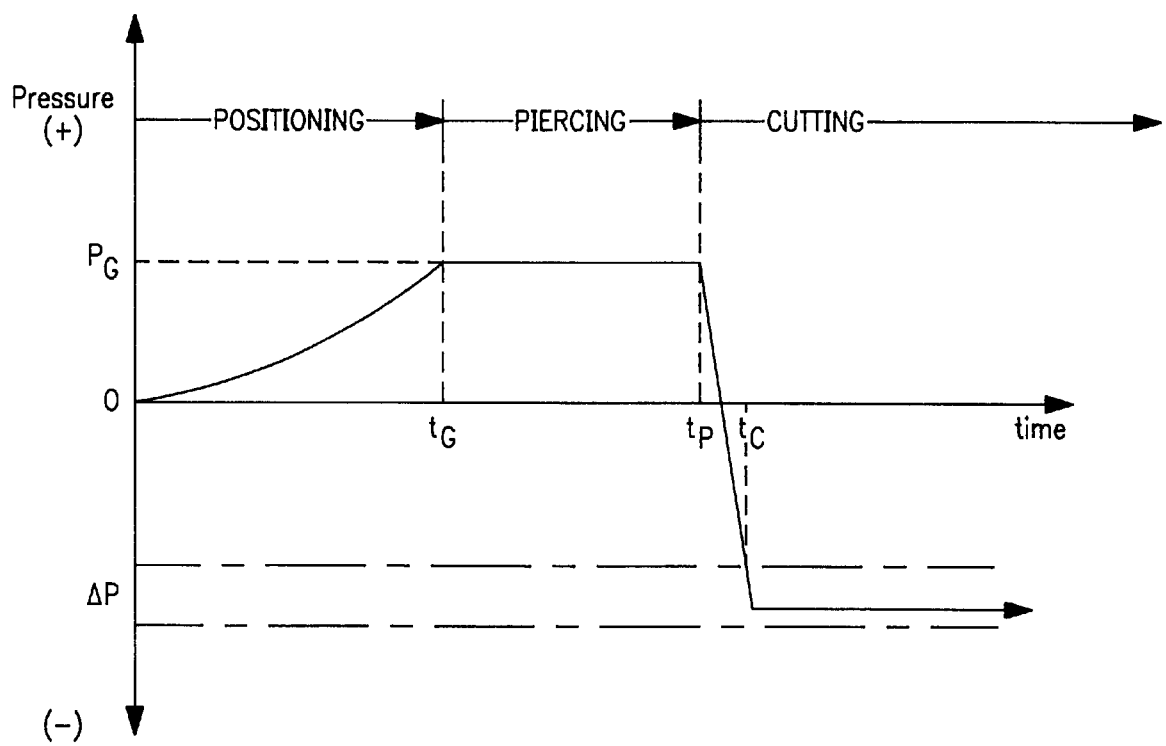
FIG. 2 is a representation of the pressure signal read by a pressure sensor during a cutting method performed according to one embodiment of the present invention.

For a cutting operation, the nozzle shield 15 is set to establish a stand-off distance (i.e., the distance between the focusing tube 14 and workpiece 16) which is about equal to air gap 17, once air gap 17 is established. This is accomplished by using pressure sensor 42 as a proximity switch which monitors in Step 130 the pressure increase caused by the restriction created between workpiece 16 and nozzle shield 15 as it moves toward the target surface. As shown in FIG. 2, the pressure inside nozzle shield 15 increases to a predetermined pressure $P_g$ which is programmed into controlling unit 30 and corresponds to the pressure at which the desired air gap 17 is formed. At this point, when Step 130 detects that nozzle assembly 10 is in position, the controlling unit 30 generates a control signal to stop the motion of the nozzle assembly 10 thereby setting the cutting position (i.e., stand-off distance) and controlling unit 30 also records this position.

B. Determining Workpiece Thickness

According to the present invention, the thickness of workpiece 16 may be measured in Step 140. This is accomplished by using controlling unit 30 to compare the height of nozzle assembly in the cutting position set in Steps 120 and 130 with a known reference position. The measured thickness of workpiece 16 is inputted into controlling unit 30 for performing calculations necessary for determining the proper operating conditions. For example, the proper traverse cutting speed at which a waterjet cuts through a particular material during an AWJ cutting operation varies indirectly with and may be calculated using workpiece thickness according to the equation disclosed in the article by J. Zeng and J. P. Munoz titled "Intelligent Automation of AWJ Cutting for Efficient Production," Proceedings of the 12th International Symposium on Jet Cutting Technology, BHRA, Rouen, France, 1994, pp. 401–408, which article is incorporated herein by reference.

In Step 150, controlling unit 30 simultaneously generates control signals 21 and 19 to, respectively, initiate the supply of high pressure water from water source 22 and abrasive from vibration feeder 20 to establish an abrasive water jet in water nozzle assembly 10. Controlling unit 30 sends a control signal 11 to move nozzle assembly 10 preferably at a constant rate (e.g., 50 inches per minute (ipm)) along a circle which has a radius equal to the focusing tube diameter until workpiece 16 is pierced.

C. Detecting Pierce-Through of a Workpiece

Prior to commencing a traverse cutting motion of the nozzle assembly 10 across workpiece 16, the moment the waterjet pierces workpiece 16 is first detected. According to one embodiment of the present invention shown in FIG. 1, this is accomplished by air supply 40 maintaining a steady flow of air to nozzle shield 15 during the time the piercing operation is being performed. Pressure sensor 42 simultaneously monitors and provides a steady output signal 43 to controlling unit 30 as represented by the horizontal signal between "$t_g$" and "$t_p$" in FIG. 2. Upon penetration (i.e., "pierce-through") of the waterjet through workpiece 16, a vacuum is created within nozzle shield 15 which, as shown in FIG. 2, causes a virtually instantaneous drop in the pressure detected by pressure sensor 42 at "$t_p$" which is the moment pierce-through occurs.

Upon detecting the decrease in pressure in Step 160 caused upon pierce-through, the desired cutting operation is then initiated in Step 190 by controlling unit 30 which either sends a control signal 11 to begin horizontal movement of nozzle assembly 10, sends a control signal 26 to begin horizontal movement of workpiece 16, or both, to laterally move nozzle assembly 10 at the proper cutting speed relative to workpiece 16, which cutting speed may be calculated as discussed above. The cutting operation is monitored in Step 200 either visually or automatically (e.g., by a mechanical sensor switch as is known in the art) to detect when the cutting operation is complete.

D. Stand-Off Distance Monitoring

During the cutting operation, air gap 17 between the nozzle assembly 10 and workpiece 16 is preferably monitored in Step 210 for any changes by monitoring the signal provided by pressure sensor 42 for any variation in the signal after time "$t_c$" which represents the time at which pierce-through is completed and cutting begins as shown in FIG. 2. Should any variation above or below a predetermined pressure range (represented as "$\Delta P$" in FIG. 2), which range corresponds to an acceptable stand-off distance tolerance, an error signal is sent by the controlling unit 30 via connection 11 to implement compensation in Step 220 by the motion equipment to adjust the stand-off distance. Alternatively, controlling unit 30 may be programmed to send an error signal via connections 19 and 21 to respectively stop the flow of abrasive and water to interrupt the AWJ operation being performed.

With respect to devices which may be incorporated as pressure sensor 42, any sensor that can detect the increase and decrease of pressure within nozzle shield 15, as described above, may be incorporated. An exemplary device includes, but is not limited to, a Model OKC-424 Air Proximity Sensor, available form O'Keefe Controls Co., Monroe, Conn.

As a result of the multi-functional sensing method and apparatus of the present invention, a number of advantages in sensing various physical aspects of machining processes such as AWJ cutting processes may be achieved. Among these advantages are the ability to determine and monitor various physical dimensions of and the proximity and distances between various apparatus and workpiece components. For example, various measurement functions may be automatically accomplished using the multi-functional sensing method and apparatus of the present invention including, proximity detection of the waterjet nozzle, measuring the thickness of a workpiece, and real time monitoring and correction of nozzle stand-off distance. Additionally, physical events such as pierce-through of a workpiece may also be detected using the multi-functional sensing method and apparatus of the present invention.

Moreover, when used in conjunction with a CNC controlling unit, the multi-functional sensing method and apparatus of the present invention facilitates the automatic programming, calculating, and control of various machining parameters and operating conditions without the need for any user interference or interface while also increasing the accuracy of the operating parameters and conditions so determined. Additionally, changes in process parameters (e.g., cutting speed, changes in water pressure, abrasive flow rate, abrasive type, nozzle diameter, etc.) may also be made automatically based on sensed condition changes (e.g., different workpiece thicknesses) using the multi-functional sensing methods and apparatus of the present invention.

Alternative Embodiments to Monitor Additional Machining Technologies

Although illustrated and described herein with reference to certain specific embodiments, the present invention is nevertheless not intended to be limited to the details shown. Rather, various modifications may be made in the details in the scope and range of equivalents of the claims without departing from the spirit of the invention. For example, although described above with respect to monitoring an AWJ cutting operation using an AWJ waterjet moved through a circular motion, it is expected that the sensing method and apparatus may be employed to monitor a variety of other machining processes which can incorporate any variety of piercing motions and energy beam machining technologies.

Examples of alternate piercing motion patterns which may be used include, but are not limited to, a linear, back-and-forth, star, wiggle or other pattern. Additionally, it is further envisioned that the energy beam processes including AWJ may be used to perform a variety of other AWJ and traditional operations such as piercing, drilling, milling and turning operations.

Such other energy beam technologies include those which utilize a concentrated beam energy to effect material removal to cut or otherwise make, shape, prepare, or finish (i.e., machine) a raw stock material into a finished material. By way of example, it is envisioned that the sensing method and apparatus of the present invention may be used with and incorporated into other types of energy beam technologies, including but not limited to, pure waterjet, laser, plasma arc, flame cutting, and electron beam technologies. Although each of these technologies use different physical phenomena to remove material, they behave similarly in nature and methodology to a waterjet energy beam such that the sensing method and apparatus of the present invention may be employed.

Furthermore, it is to be understood that the selection of alternative energy beam technologies to which the present invention may be applied is not limited to these specific examples which are merely illustrative. Rather, these energy beam technologies will be readily recognized and may be selected by those having ordinary skill in the art.

What is claimed is:

1. An apparatus for detecting the distance between a nozzle assembly for a machining process and a workpiece to be machined, comprising:
   a shield means for surrounding a nozzle assembly, said shield means being open at one end to permit a piercing force from said nozzle assembly to exit said shield means;
   a means for supplying a gas to create a pressure within said shield means; and
   a sensing means for detecting an increase in pressure caused within said shield means as said open end of said shield means approaches a workpiece to be machined, said sensing means being disposed between and in fluid communication with said means for supplying gas and said shield means.

2. A An apparatus for detecting the distance between a nozzle assembly for a machining process and a workpiece to be machined according to claim 1, further comprising a controlling means which monitors said sensing means and detects when said pressure within said shield means reaches a pressure which corresponds to a predetermined gap distance between nozzle assembly and said workpiece for a machining process.

3. An apparatus for detecting the distance between a nozzle assembly for a machining process and a workpiece to be machined according to claim 2, wherein said controlling means also monitors the position of said nozzle assembly upon establishing said gap distance and compares this position with a predetermined reference position to determine a thickness of said workpiece.

4. An apparatus for detecting the distance between a nozzle assembly for a machining process and a workpiece to be machined according to claim 1, further comprising a controlling means which monitors said sensing means and detects when said pressure within said shield means varies outside of a pressure range, said range corresponding to an acceptable predetermined range of gap distances between nozzle assembly and said workpiece for a machining process.

5. An apparatus for detecting the distance between a nozzle assembly for a machining process and a workpiece to be machined according to claim 1, wherein said piercing force is a concentrated beam energy selected from the group consisting of an abrasive waterjet, a pure waterjet, a laser, a plasma arc, a flame, and an electron beam.

6. An apparatus for detecting the distance between a nozzle assembly for a machining process and a workpiece to be machined according to claim 1, wherein said piercing force performs a machining operation selected from the group consisting of a cutting, a piercing, a drilling, a milling, and a turning operation, and combinations thereof.

7. A method of detecting the distance between a nozzle assembly for a machining process and a workpiece to be machined, comprising:
   supplying a gas to create a pressure within a shield means surrounding a nozzle assembly, said shield means being open at one end to permit a piercing force from said nozzle assembly to exit said shield means;
   detecting an increase in pressure caused within said shield means as said open end of said shield means approaches a workpiece to be machined;

monitoring said increase in pressure within said shield means; and detecting when said pressure reaches a pressure which corresponds to a predetermined gap distance between said nozzle assembly and said workpiece for a machining process.

8. A method of detecting the distance between a nozzle assembly for a machining process and a workpiece to be machined according to claim 7, wherein said monitoring step further comprises monitoring a position of said nozzle assembly upon establishing said gap distance, and comparing this position with a predetermined reference position to determine a thickness of said workpiece.

9. A method of detecting the distance between a nozzle assembly for a machining process and a workpiece to be machined according to claim 7, further comprising the steps of monitoring said sensing means and detecting when said pressure within said shield means varies outside of a pressure range, said range corresponding to an acceptable predetermined range of gap distances between nozzle assembly and said workpiece for a machining process.

10. A method of detecting the distance between a nozzle assembly for a machining process and a workpiece to be machined according to claim 7, wherein said piercing force is a concentrated beam energy selected from the group consisting of an abrasive waterjet, a pure waterjet, a laser, a plasma arc, a flame, and an electron beam.

11. A method of detecting the distance between a nozzle assembly for a machining process and a workpiece to be machined according to claim 7, wherein said piercing force performs a machining operation selected from the group consisting of a cutting, a piercing, a drilling, a milling, and a turning operation, and combinations thereof.

12. An apparatus for sensing a pierce-through condition of a material made by a piercing force, comprising:

a shield means for surrounding a source of a piercing force;

a means for supplying a gas to create a pressure within said shield means; and a sensing means for detecting a decrease in pressure caused within said shield means by said pierce-through condition created by said piercing force, said sensing means being disposed between and in fluid communication with said means for supplying gas and said shield means.

13. An apparatus for sensing a pierce-through condition of a material according to claim 12, wherein said piercing force is a concentrated beam energy selected from the group consisting of an abrasive waterjet, a pure waterjet, a laser, a plasma arc, a flame, and an electron beam.

14. An apparatus for sensing a pierce-through condition of a material according to claim 12, wherein said piercing force performs a machining operation selected from the group consisting of a cutting, a piercing, a drilling, a milling, and a turning operation, and combinations thereof.

\* \* \* \* \*